United States Patent [19]

Sutter, Jr.

[11] Patent Number: 4,620,306

[45] Date of Patent: * Oct. 28, 1986

[54] ELONGATED CHAMBERS FOR USE IN COMBINATION WITH A TRANSVERSELY EXCITED GAS LASER

[76] Inventor: Leroy V. Sutter, Jr., 6301 Summertime La., Culver City, Calif. 90230

[*] Notice: The portion of the term of this patent subsequent to Aug. 7, 2001 has been disclaimed.

[21] Appl. No.: 633,855

[22] Filed: Jul. 24, 1984

Related U.S. Application Data

[60] Division of Ser. No. 403,781, Jul. 30, 1982, Pat. No. 4,464,760, which is a continuation-in-part of Ser. No. 370,103, Apr. 20, 1982, Pat. No. 4,455,658.

[51] Int. Cl.$^4$ ............................................. H01S 3/09
[52] U.S. Cl. ...................................... 372/38; 372/61; 372/82
[58] Field of Search ...................... 372/38, 61, 64, 81, 372/82, 83, 87

[56] References Cited

U.S. PATENT DOCUMENTS

| | | | |
|---|---|---|---|
| 4,169,251 | 9/1979 | Laakman | 372/64 |
| 4,363,126 | 12/1982 | Chenausky et al. | 372/38 |
| 4,375,690 | 3/1983 | Tabata et al. | 372/82 |
| 4,443,877 | 4/1984 | Chenausky et al. | 372/38 |

Primary Examiner—James W. Davie
Attorney, Agent, or Firm—W. Edward Johansen

[57] ABSTRACT

The present invention is a gas laser which includes an elongated chamber of cross-sectional dimensions which is suitable for confining a laser gas discharge and which is formed from a dielectric material. A laser gas is disposed in the elongated chamber. The gas laser also include a pair of reflector which reflect and guide light energy from the laser gas discharge within the elongated chamber so that said light energy is optically independent of the internal walls of the elongated chamber as the light energy travels longitudinally the length of the elongated chamber. The gas laser also includes a first pair of electrode plates and a second pair of electrode plates for transversely exciting the laser gas. Each of the first pair and second pair of electrode plates is formed from an electrically conductive material. An energy source applies a voltage of alternating polarity to the first and second pairs of electrode plates in phase correlation at a frequency ranging from 10 Mhz to about 3 GHz to establish a laser gas discharge in the laser gas and a coupler matches the impedance of the elongated chamber and the first and second pair of electrode plates to the impedance of the energy source.

4 Claims, 9 Drawing Figures

ELONGATED CHAMBERS FOR USE IN COMBINATION WITH A TRANSVERSELY EXCITED GAS LASER

This is a divisional of copending application Ser. No. 403,781, filed July 30, 1982, now U.S. Pat. No. 4,464,760, which is a continuation-in-part of Ser. No. 370,103, filed Apr. 20, 1982, now U.S. Pat. No. 4,455,658.

BACKGROUND OF THE INVENTION

1. Field of the Invention

The present invention relates to transversely excited lasers and more particularly to an improved elongated chamber of the laser bore and electrode structure.

2. Description of the Prior Art

U.S. Pat. No. 4,352,188, entitled RF Pumped Waveguide Laser with Inductive Loading for Enhancing Discharge Uniformity, issued to Glen A. Griffith on Sept. 28, 1982, teaches a discharge-excited waveguide gas laser which utilizes a transverse rf excitation voltage at a frequency of at least about 30 MHz applied between elongated electrodes on opposite sides of the laser discharge chamber and which a plurality of shunt inductances coupled between the electrodes externally along the length of the chamber. Theses inductances provide a negative admittance which compensates for the variation in the phase angle of the transmission line reflection coefficient along the length of the laser discharge chamber. The variation in the magnitude of the standing wave voltage is reduced accordingly thereby improving the uniformity of the laser-exciting discharge.

U. S. Pat. No. 4,169,251, teaches Waveguide Gas Laser with High Frequency Transverse Discharge Excitation, issued to Katherine D. Laakman on Sept. 25, 1979, teaches waveguide lasers which are excited by means of a transverse discharge at rf frequencies generally in the vhf-uhf range, i.e., from about 30 MHz to about 3 GHz. These excitation frequencies are sufficiently high to ensure negligible interaction of discharge electrons with the discharge-establishing electrodes, thereby achieving superior discharge properties which result in a laser of improved performance and reduced size and complexity.

Recently there has been considerable interest in waveguide gas lasers wherein the laser light propagates through a hollow waveguide which also serves to confine the laser-exciting discharge. U.S. Pat. No. 3,772,611, entitled Waveguide Gas Laser Devices, issued to Peter William Smith on Nov. 13, 1973, teaches the basic excitation scheme which was used in most of the early waveguide lasers and which involves establishing a dc electric discharge longitudinally through the device between a pair of electrodes disposed near the respective ends of the laser waveguide. This type of discharge required relatively large dc excitation voltages of around 10 Kv along with the necessary power supply and associated circuitry for generating voltages of this magnitude.

U.S. Pat. No. 3,772,611, also teaches the exciting of a ring-type waveguide laser from an rf source by means of a coil wound around the ring-shaped waveguide. Such a coil-type excitation arrangement not only is incapable of providing a highly uniform discharge, but it also affords poor coupling efficiency. Moreover, when more than a few coil turns are employed, the inductance of the coil becomes sufficiently large to limit the usable excitation frequencies below a few MHz.

In order to obtain a more uniform discharge with reduced excitation voltage, waveguide lasers have been developed wherein a pulsed discharge is established along a transverse waveguide dimension. U.S. Pat. No. 3,815,047, entitled Transversely-Excited Waveguide Gas Laser, issued to Peter William Smith and Obert Reeves Wood on June 4, 1974, teaches transversely-excited waveguide gas lasers which include a structure having a smooth base copper-anode and a plurality of cathode squares plated on a dielectric forming the wall opposite the copper-anode and a laser excitation source which is electrically coupled to the anode and cathode of the structure. The transversely-excited waveguide gas lasers also include an enclosure which encloses the structure and a plurality of gas inlets and outlets which maintain the laser gases at high total gas pressure within the structure. The transversely-excited waveguide gas lasers which have been operated in the quasi-continuous mode at pulse repetition rates as high as 40 kHz, as described in an article by Smith et al., entitled "Repetition-Rate and Quasi-CW Operation of a Waveguide Laser $CO_2$ TE $_{00}$ Laser", published in Optics Communication, Volume 16, Number 1, on January 1976, pages 50–53.

U.S. Pat. No. 4,103,255, entitled High Power, Compact Waveguide Gas Laser, issued Howard R. Schlossberg on July 25, 1978, teaches a high power, compact waveguide gas laser housing located within a resonant cavity. The housing has a longitudinal chamber situated therein. The chamber is divided into a plurality of waveguides by a plurality of infrared transmitting partitions. During operation of the laser, the leakage of laser radiation between adjacent waveguides through the partitions causes coupling of the phases of the waveguide modes thereby producing a laser output of high power.

SUMMARY OF THE INVENTION

In view of the foregoing factors and conditions which are characteristic of the prior art it is the primary object of the present invention to provide an improved elongated chamber which forms a laser bore and electrode structure of a transversely excited gas laser and which has a cross-section in the shape of a four pointed star in order to provide a laser energy flux for the lowest order Laguerre-Gaussian $TEM_{00}$ mode which peaks at the center of the star-shaped elongated chamber.

It is another object of the present invention to provide a star-shaped elongated chamber which forms a laser bore and electrode structure of a transversely excited gas laser and which has a uniform laser discharge over its cross-section wherein the laser discharge peaks at the bore center for optimum coupling to the lowest order Laguerre-Gaussian $TEM_0$ $_0$ mode. Thus the star-shaped elongated chamber increases the coupling of the laser discharge pumping to the laser energy flux which improves the efficiency of the transversely excited gas laser.

It is still another object of the present invention to provide a rf generator which is electrically coupled to the electrodes of the transversely excited gas laser in phase correlation.

In accordance with the present invention an embodiment of an improved laser bore and electrode structure including an elongated chamber for use in combination with a gas laser within which a laser gas is disposed is described. The laser also includes first and second reflectors which reflect light energy from the laser gas discharge within the elongated chamber so that the light energy travels longitudinally the length fo the elongated chamber and first and second electrodes which transversely excite the laser gas. Each of the electrodes is formed from an electrically conductive material and they are disposed opposing each other. An energy generator applies a voltage of alternating polarity between the first and second electrodes at a frequency ranging from 10 Mhz to about 3 GHz to establish a laser gas discharge in the laser gas. A coupling network matches the steady state impedance of the elongated chamber to the impedance of the energy generator and couples the first electrode to the second electrode in order to cancel the pre-ignition reactive impedance of the elongated chamber, the first impedance-matching network coupling the first and second electrode and the second impedance-matching network to the energy generator. The improved laser bore and electrode structure includes an elongated chamber which is in the shape of a four pointed star and which is of cross-sectional dimensions suitable for confining a laser gas discharge. The elongated chamber is formed from a dielectric material.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
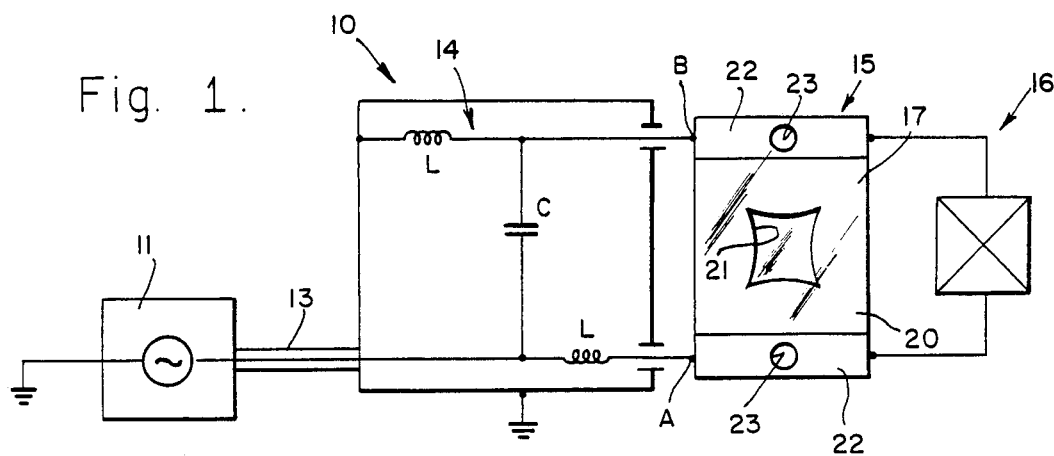
FIG. 1 is a schematic drawing of a transversely excited gas laser including an improved coupling circuit including first and second impedance-matching circuits in combination with a laser bore and electrode structure which has a star-shaped elongated chamber and which has been constructed in accordance with the principles of the preferred embodiment of the present invention.

In order to best understand the present invention it is necessary to refer to the following description of its preferred embodiment in conjunction with the accompanying drawing. Referring to FIG. 1 a transversely excited gas laser 10 includes an rf generator 11, an improved coupling circuit and a coaxial connector 13 which electrically couples the rf generator 11 to the improved coupling circuit. The improved coupling circuit includes a first impedance-matching circuit 14, which is electrically coupled to feed points A and B of a laser bore and electrode structure 15, and a second impedance-matching circuit 16, which is electrically coupled across the laser bore and electrode structure 15. The transversely excited gas laser 10 further includes a pair of optical reflectors 17, which form a laser resonator.

Figure 2:
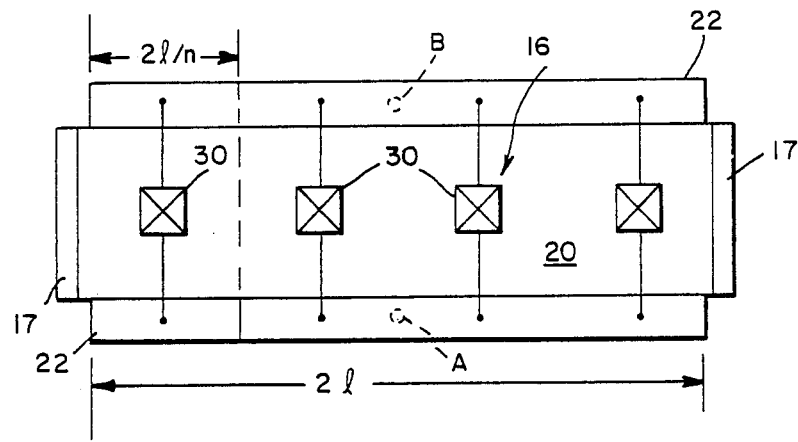
FIG. 2 is a side elevational view of the plurality of casings each of which encloses one of a plurality of LC circuits which together form the second impedance-matching circuit of FIG. 1.

Referring to FIG. 2 in conjunction with FIG. 1 the laser bore and electrode 15 includes an elongated chamber 20 which is in the shape of a four-pointed star and which is of cross-sectional dimensions, not only in the range of 0.25 $mm^2$ to 7.5 $mm^2$, but also in the range greater than 7.5 $mm^2$, which is suitable for confining a laser gas discharge. The star-shaped elongated chamber 20 includes walls 21 which are curved inwardly toward the center of the star-shaped elongated chamber 20 and which are formed from a dielectric material, such as BeO, $Al_2O_3$ or glass. The laser bore and electrode structure 15 also includes first and second parallel electrode plates 22 each of which has a cooling bore 23 through which a coolant can flow. The first and second parallel electrode plates 22 are formed from an electrically conductive material, such as aluminum or copper, and are disposed opposing each other. The first and second electrode plates 22 are used for transverely exciting a laser gas, which may be a standard $CO_2$ laser gas 24 mixture including 65% He, 22% $N_2$, 13% $CO_2$ by mole fraction. The rf generator 11 provides an alternating electric field in the star-shaped elongated chamber 20 along a direction transverse to the length of the star-shaped elongated chamber 20 and at a frequency ranging from 10 MHz to about 3 GHz to establish the laser gas discharge in the laser gas 24.

A sufficient amount of the laser gas 24 must be maintained in the star-shaped elongated chamber 20 in order to support the laser gas discharge. The laser gas 24 is at pressure ranging from 1 Torr to about 1000 Torr. The laser gas 24 is sealed in the elongated chamber 20. In the preferred embodiment the pair of optical reflectors 17 are optically aligned with and mechanically coupled to the star-shaped elongated chamber 20 in order to seal the laser gas 24 in the star-shaped elongated chamber 20.

The optical reflectors 17 reflect light energy from the laser gas discharge within the star-shaped elongated chamber 20 so that the light energy travels longitudinally the length of the star-shaped elongated chamber 20. In the preferred embodiment the optical reflectors 17 not only reflect, but also guide the light energy within the star-shaped elongated chamber 20 so that the light energy is optically independent of the internal walls 21 of the star-shaped elongated chamber 20.

In another embodiment the transversely excited gas laser 10 may also include a gas inlet and a gas outlet for letting the laser gas 24 into and out of the elongated chamber 20 and a gas regulating device for regulating the pressure of the laser gas 24 in the star-shaped elongated chamber 20.

In still other embodiments the transversely excited gas laser 10 may include an enclosure in which the star-shaped elongated chamber 20 is disposed and the laser gas 24 is sealed. The transversely excited gas laser 10 may also include a gas inlet and a gas outlet for letting the laser gas 24 into and out of the enclosure and a gas regulating device for regulating the pressure of the laser gas 24 in the enclosure.

Figure 3:
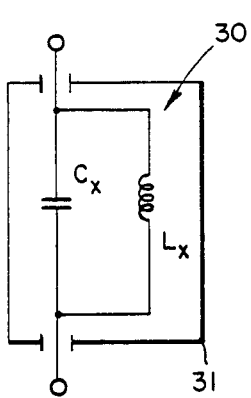
FIG. 3 is a schematic drawing of the LC circuit in each of the casings of FIG. 2.

Referring to FIG. 2 in conjunction with FIG. 3 the second impedance-matching circuit 16 includes a plurality of LC circuits 30 each of which is enclosed in a casing 31 and which together form the second impedance-matching circuit 16.

Figure 4:
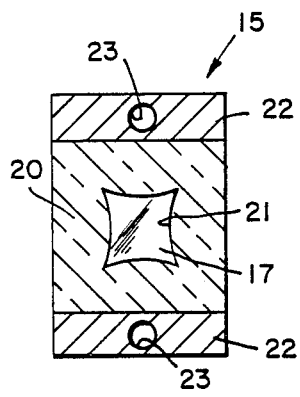
FIG. 4 is a transverse cross-sectional view of the star-shaped elongated chamber and an opposing pair of parallel electrode plates of the laser bore and electrode structure of FIG. 1.
Figure 5:
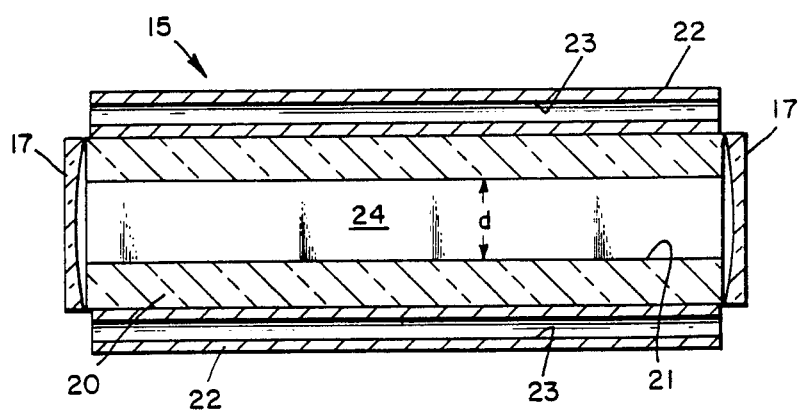
FIG. 5 is a longitudinal cross-sectional view of the star-shaped elongated chamber and an opposing pair of parallel electrode plates of FIG. 4.

Referring to FIG. 4 and FIG. 5 in conjunction with FIG. 1 and FIG. 2 in the preferred embodiment of the laser bore and electrode structure 15 the elongated chamber 20 has a cross-section in the shape of a four pointed star. The star-shaped elongated chamber 20 has first and second opposing curved walls 21, separated a minimum distance d apart, and third and fourth opposing curved walls 21, all of which are formed from a dielectric material.

Figure 6:
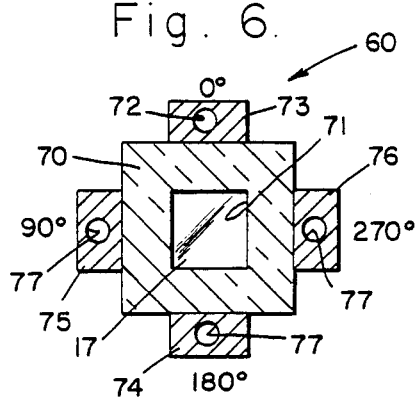
FIG. 6 is a transverse cross-sectional view of an elongated chamber of a square cross-section and two sets of opposing pairs of parallel electrode plates of a laser bore and electrode structure wherein an rf generator delivers energy which is phase correlated.

Referring to FIG. 6 a second embodiment of a transversely excited gas laser 60 has a laser bore and electrode structure 65 includes an elongated chamber 70 which is rectangular in cross-section and which has cross-sectional dimensions, not only in the range of 0.25 mm$^2$ to 7.5 mm$^2$, but also in the range greater than 7.5 mm$^2$, which is suitable for confining a laser gas discharge. The rectangular elongated chamber 70 includes walls 71 which are formed from a dielectric material, such as BeO, Al$_2$O$_3$ or glass. The laser bore and electrode structure 65 also includes a first electrode plate 73, a second parallel electrode plate 74, which is disposed parallel and oppositely to the first electrode plate 73, a third electrode plate 75 and a fourth parallel electrode plate 76, which is disposed parallel and oppositely to the third electrode plate 75 and which is also disposed orthogonally to the first and second electrode plates 73 and 74. Each of electrode plates 73, 74, 75 and 76 has a cooling bore 77 through which a coolant can flow and is formed from an electrically conductive material, such as aluminum or copper. The electrode plates 73, 74, 75 and 76 are used for transverely exciting a laser gas, which may be a standard CO$_2$ laser gas mixture including 65% He, 22% N$_2$, 13% CO$_2$ by mole fraction. The rf generator 11 provides an alternating electric field in the rectangular elongated chamber 70 along a direction transverse to the length of the rectangular elongated chamber 70 and at a frequency ranging from 10 MHz to about 3 GHz to establish the laser gas discharge in the laser gas 24. The rf generator 11 is electrically coupled to the electrode plates 73, 74, 75 and 76 in phase correlation wherein the first electrode plate 73 is 180° out of phase with the second electrode plate 74, the third electrode plate 75 is 180° out of phase with the fourth electrode plate 76 and the first electrode plate 73 is 90° out of phase with the third electrode plate 75 wherein the laser discharge of the transversely excited laser 60 will appear to "spin" or "rotate" in time in a counter-clockwise fashion. If the third and fourth electrodes 75 and 76 are reversed in polarity the laser discharge will appear to rotate in a clockwise fashion. The phase angles are shown in FIG. 6.

Figure 7:
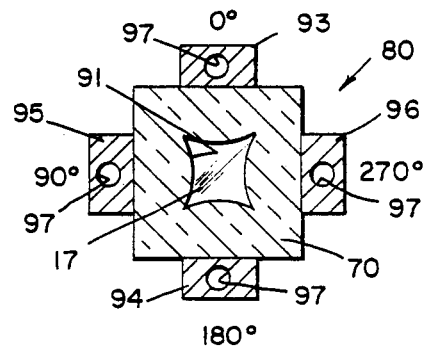
FIG. 7 is a transverse cross-sectional view of an elongated chamber of a cross-section in the shape of a four pointed star and two sets of opposing pairs of parallel electrode plates of a laser bore and electrode structure wherein an rf generator delivers energy which is phase correlated.

Referring to FIG. 7 a third embodiment of a transversely excited gas laser 80 has a laser bore and electrode structure 85 includes the star-shaped elongated chamber 20 which is suitable for confining a laser gas discharge. The star-shaped elongated chamber 20 includes walls 21 which are formed from a dielectric material, such as BeO, Al$_2$O$_3$ or glass. The laser bore and electrode structure 85 also includes a first electrode plate 73, a second parallel electrode plate 94, which is disposed parallel and oppositely to the first electrode plate 93, a third electrode plate 95 and a fourth parallel electrode plate 96, which is disposed parallel and oppositely to the third electrode plate 95 and which is also disposed orthogonally to the first and second electrode plates 93 and 94. Each of electrode plates 93, 94, 95 and 96 has a cooling bore 97 through which a coolant can flow and is formed from an electrically conductive material, such as aluminum or copper. The electrode plates 93, 94, 95 and 96 are used for transverely exciting a laser gas 24. The rf generator 11 provides an alternating electric field in the rectangular elongated chamber 20 along a direction transverse to the length of the rectangular elongated chamber 20 and at a frequency ranging from 10 MHz to about 3 GHz to establish the laser gas discharge in the laser gas 24. The rf generator 11 is electrically coupled to the electrode plates 93, 94, 95 and 96 in phase correlation wherein the first electrode plate 93 is 180° out of phase with the second electrode plate 94, the third electrode plate 95 is 180° out of phase with the fourth electrode plate 97 and the first electrode plate 93 is 90° out of phase with the third electrode plate 95 wherein the laser discharge of the transversely excited laser 80 will appear to "spin" or "rotate" in time in a counter-clockwise fashion. If the third and fourth electrodes 95 and 96 are reversed in polarity the laser discharge will appear to rotate in a clockwise fashion. The phase angles are shown in FIG. 7.

Figure 8:
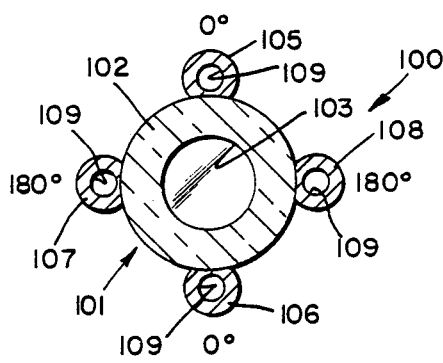
FIG. 8 is a transverse cross-sectional view of an elongated chamber of a circular cross-section and two sets of opposing pairs of parallel electrode plates of a laser bore and electrode structure wherein an rf generator delivers energy which is phase correlated.
Figure 9:
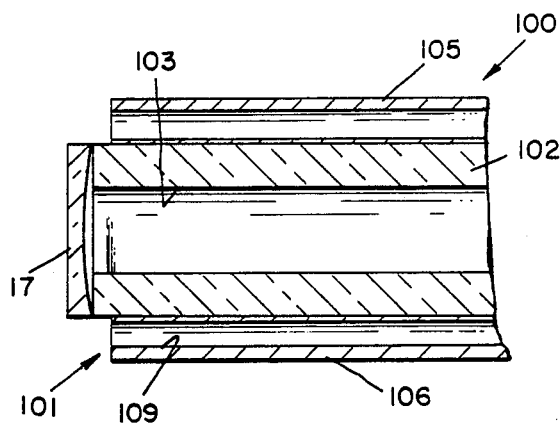
FIG. 9 is a longitudinal cross-sectional view of the cylindrical chamber and two sets of opposing pairs of parallel electrode plates of FIG. 8.

Referring to FIG. 8 in conjunction with FIG. 9 a fourth embodiment of a transversley excited gas laser 100 has a laser bore and electrode structure 101 includes the chamber 102 which is circuilar in cross-section and which is suitable for confining a laser gas discharge. The circular elongated chamber 102 has a cylindrical wall 103 which is formed from a dielectric material, such as BeO, Al$_2$O$_3$ or glass. The laser bore and electrode structure 101 also includes a first electrode plate 105, a second parallel plate 106, which is disposed parallel and oppositely to the first electrode plate 105, a third electrode plate 107 and a fourth parallel electrode plate 108, which is disposed parallel and oppositely to the third electrode plate 107 and which is also disposed orthogonally to the first and second electrode plates 105 and 106. Each of electrode plates 105, 106, 107 and 108 has a cooling bore 109 through which a coolant can flow and is formed from an electrically conductive material, such as aluminum or copper. The electrode plates 105, 106, 107 and 108 are used for transverely exciting a laser gas 24. The rf generator 11 provides an alternating electric field in the circular elongated chamber 102 along a direction transverse to the length of the circular elongated chamber 102 and at a frequency ranging from 10 MHz to about 3 GHz to establish the laser gas discharge in the laser gas 24. The rf generator 11 is electrically coupled to the electrode plates 105, 106, 107 and 108 in phase correlation wherein the first and second electrode plates 105 and 106 are in phase and the third and fourth electrode plates 107 and 108 are in phase with the first electrode plate 105 being 180 out of phase with the third electrode plate. The fourth transversely excited gas laser 100 will generate $TEM_0$ $_1*$, which is a Laguerre-Gausian mode of a higher order than the $TEM_{00}$ mode which the first three lasers 10, 60 and 80 produce more readily. The laser discharge will occur around the outside of the cylindrical wall 103 of the circular elongated chamber 102 and the electrodes 105, 106, 107 and 108 are symmetrically disposed whereby the laser discharge is "doughnut" shaped. The doughnut-shaped discharge in the circular elongated chamber 102 promotes the oscillations of the $TEM_0$ $_1*$ mode.

From the foregoing it can be seen that improved elongated chamber of the laser bore and electrode structures for transversely excited gas lasers have been described. The advantage of the improved elongated chambers is that the design of the elongated chamber determines in which mode the transversely excited gas laser will operate. The starshaped elongated chamber provides a transversely excited gas laser which operates most efficiently in the $TEM_{00}$ mode whereas the circular elongated chamber provides a transversely excited gas laser which operates most efficientlyl in the $TEM_0$ $_1*$ mode. It should be noted that distance of and between the figures are not to be considered significant.

Accordingly it is intended that the foregoing disclosure and showing made in the drawing shall be considered only as an illustration of the principles of the present invention.

What is claimed is:

1. A gas laser comprising:
   a. an elongated chamber of cross-sectional dimensions suitable for confining a laser gas discharge, said elongated chamber being formed from a dielectric material;
   b. a laser gas disposed in said elongated chamber;
   c. first and second reflecting means for reflecting and guiding light energy from said laser gas discharge within said elongated chamber so that said light energy is optically independent of the internal walls of said elongated chamber as said light energy travels longitudinally the length of said elongated chamber; and
   d. first and second electrode means for transversely exciting said laser gas, each of said electrode means being formed from an electrically conductive material and being disposed opposing each other wherein said first and second electrode means are disposed longitudinally on said elongated chamber;
   e. third and fourth electrode means for transversely exciting said laser gas, each of said electrode means being formed from an electrically conductive material and being disposed opposing each other wherein said third and fourth electrode means are disposed longitudinally on said elongated chamber and are disposed orthogonally to said first and second electrode means;
   f. energy means for applying a voltage of alternating polarity to said first and second electrode means and said third and fourth electrode means at a frequency ranging from 10 Mhz to about 3 GHz to establish a laser gas discharge in said laser gas; and
   g. coupling means for matching the impedance of said elongated chamber and said first and second electrode means and said third and fourth electrode means to the impedance of said energy means.

2. A gas laser according to claim 1 wherein said elongated chamber has a rectangular cross-section and the phase correlation of said electrode means is such that said first electrode means is 180° out of phase with said second electrode means, said third electrode means is 180° out of phase with said fourth electrode means and said first electrode means is 90° out of phase with said third electrode means.

3. A gas laser according to claim 1 wherein said elongated chamber has a circular cross-section and the phase correlation of said electrode means is such that said first electrode means is in phase with said second electrode means, said third electrode means in is phase with said fourth electrode means and said first electrode means is 180° out of phase with said third electrode means.

4. A gas laser according to claim 1 wherein said elongated chamber has a cross-section which is the shape of a four-pointed star and the phase correlation of said electrode means is such that said first electrode means is 180° out of phase with said second electrode means, said third electrode means is 180° out of phase with said fourth electrode means and said first electrode means is 90° out of phase with said third electrode means.

* * * * *